March 19, 1946.  G. C. FIELDS  2,396,840
BLOW-OFF VALVE
Filed April 10, 1943  3 Sheets-Sheet 1

INVENTOR.
GEORGE C. FIELDS
BY
Donald W. Farrington
ATTORNEY

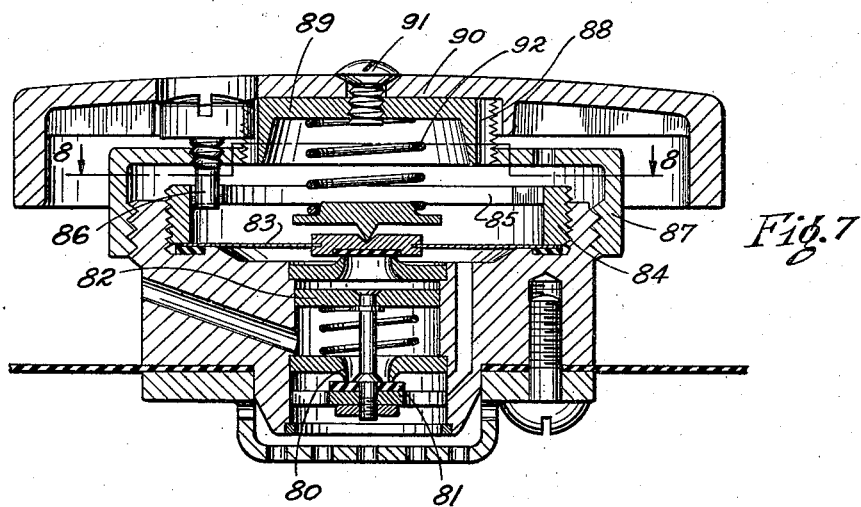
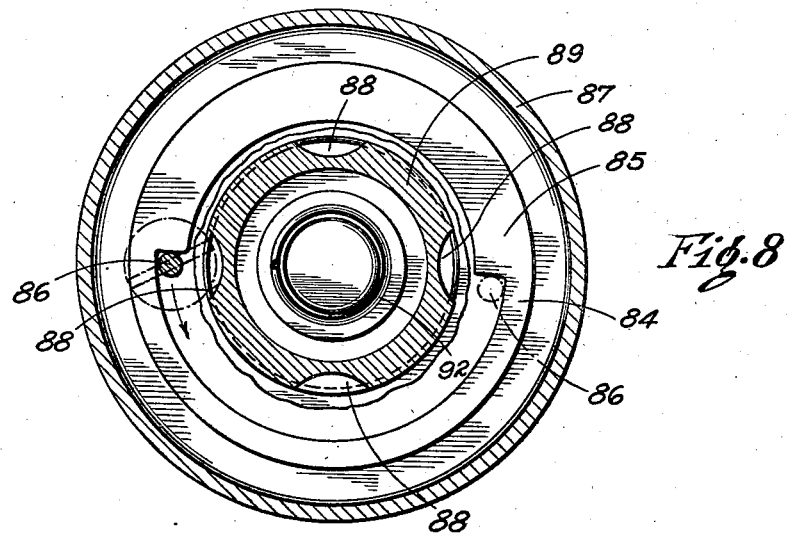

Patented Mar. 19, 1946

2,396,840

UNITED STATES PATENT OFFICE 2,396,840

BLOWOFF VALVE

George C. Fields, Euclid, Ohio

Application April 10, 1943, Serial No. 482,519

3 Claims. (Cl. 137—53)

This invention relates to pressure relief valves and more particularly to a pressure relief valve adapted to open and close within an extremely narrow range of pressure differences.

It is among the objects of my invention to provide a pressure relief valve in which the closure for the port opening effecting pressure release is moved to its open position by a means responsive to the pressure being controlled so designed that the opening and closing of the port is relatively free from the adverse effects of Hooke's law.

It is a further object of my invention to provide a pressure release valve for a fluid pressure container wherein the closure for the release port is moved to its open position by a fluid pressure actuated piston which is controlled by a diaphragm responsive to the container fluid pressure.

It is a further object of my invention to provide a valve according to the preceding objects wherein the parts are constructed and arranged to control fluid pressure and release fluid pressure in a manner whereby the parts are substantially unaffected by adverse temperature and atmospheric conditions.

It is a further object of my invention to provide a pressure relief valve that is constructed and arranged so that low pressure such as, for instance, a pressure of four pounds per square inch may be controlled within relatively narrow limits such as, for instance, the range between 3.9 and 4 pounds per square inch.

It is a further object of my invention to provide a pressure relief valve for a fluid pressure container in which a closure member of the valve is urged to closed position by the container pressure and wherein the closure is operatively connected to a piston having an area exceeding the area of the closure and in which the piston is adapted to be subjected to container pressure whereby the piston movement effects a movement of the closure against container pressure so as to open a relief port.

Further objects and advantages relating to compactness of design, simplicity in construction and economies in manufacture will appear from the following description and the appended drawings wherein:

Figure 7 is a sectional view of the preferred form of my valve equipped with a regulating control; and Figure 8 is a plan view with parts in section of the valve shown in Fig. 7.

Figure 1:
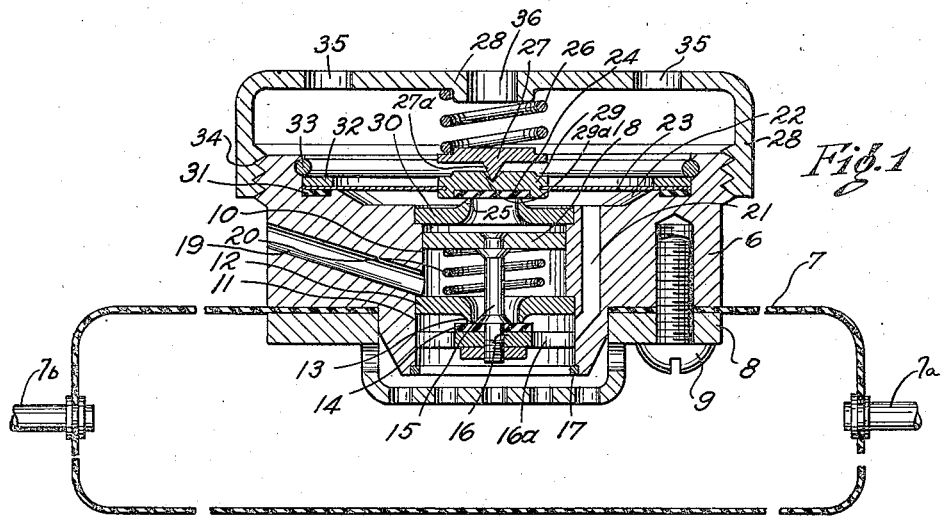
Figure 1 is a cross sectional view of a valve in its closed position made according to my invention.

Heretofore pressure relief valves which are designed to control the pressures within a container have been generally identified with one or the other of two distinct types. As will be understood by those familiar with this art, it is the function of a pressure release valve to open when the pressure within a boiler or similar container has reached a predetermined maximum so that an excessive or dangerously high pressure within the container may be avoided. As soon as the pressure within the container has been relieved to a predetermined minimum, the valve is moved to a closed position. A great many pressure release valves in the prior art have the closure for the release port backed up by a spring so that when the pressure on the closure member reaches a predetermined maximum which overcomes the resistive effect of the spring, the closure is moved to an open position. The characteristics of this type of pressure release valve are governed by the well known physical phenomena sometimes referred to as "Hooke's law."

In 1676 Hooke published the law as "ut tensio sic vis," which translated freely means "the tension is proportional to the force." When this phenomena is considered in connection with a pressure release valve port closure which is backed up by a spring, it will be appreciated that each increment of opening movement of the closure member increases the resistive effect of the spring which backs up the closure member. Accordingly, if the area of the port and its closure is increased, the size of the spring tending to hold the port closed must be increased and the inertia of the spring and closure member is such that such a pressure release valve will not open and close within relatively narrow limits. In other words, the pressure within a boiler or container may reach a predetermined maximum of, for instance, 200 pounds per square inch, before the opening movement of the closure is initiated. As soon as the container pressure equals the resistive force of the spring or like, the closure for the relief port is in balance. To open the closure appreciably and permit the escape of a substantial volume, it is necessary for the container pressure to rise substantially above the 200 pounds per square inch. At the time the container pressure equals the resistive spring pressure, there is no force available for holding the closure against the relief port and thus small quantities of fluid pressure may escape prior to a full opening of the relief port. The practical result of such prior art arrangements is that where a relief valve is open to permit the escape of a substantial volume of fluid pressure at 200 pounds per square inch, the container pressure will drop to a much lower value such as for instance, 180 pounds per square inch, before the relief port will be fully closed. This wide variation of container pressures between "open" and "closed" positions of the relief valve is not ordinarily serious when working with high pressures, but is so serious when working with relatively low pressures such as contemplated by my invention, that such prior art devices are as a practical matter without value.

The adverse effects of Hooke's law upon pressure relief valves is minimized according to certain of the prior art devices by substituting a weighted lever arm arrangement for the spring as a resistive element to hold the release port closed. It will be understood, however, that weighed lever arms are unsuited for use on aeroplanes or the like because of the rapid acceleration and deceleration and the frequent inversion of the aircraft in flight. The weighted lever-arm-controlled pressure relief valve is also subject to the serious inertia defects characteristic of the type of release valve having a spring to hold the release port closed.

Numerous attempts have been made to provide a pressure release valve that would minimize the adverse effects of Hooke's law and the inertia of the moving parts so as to provide a pressure release valve that would operate to control relatively low pressures within a narrow operating range. It will be observed that in a valve made according to my invention, the defects and disadvantages of the prior art devices have been obviated so that my valve will open and close within a narrow range of pressure variations and will when open effect a volume release presenting a marked advantage over the constructions following the prior art of comparable size. I have found that a pressure release valve made according to my invention having overall dimensions of about two inches by one and a half inches will maintain low pressures within a range of 3.6 and 3.7 pounds per square inch. In other words, I have found that my valve may be adjusted so that where it is desired to maintain a pressure of 3.65 pounds per square inch, the valve will open before the pressure has reached 3.7 pounds per square inch and will close before the pressure has dropped to 3.6 pounds per square inch and thus pressure is maintained constant within one-tenth of one pound per square inch. Such low pressures and relatively constant pressure maintenance is an essential characteristic of certain current aeronautical equipment.

My valve is also constructed so as to be free of the operating trouble which might be caused by atmospheric pressure and temperature conditions encountered by high altitude aircraft. My valve is also adapted to operate regardless of the position of the aircraft with respect to the horizon. Briefly, the objects set forth and advantages of the valve of my invention over the prior art have been achieved by mounting the release port closure on the pressure side of the port, connecting the closure member operatively to a device which is adapted to be moved to port opening position by admitting fluid pressure to the device through a diaphragm controlled port which diaphragm is movably responsive to fluid pressure variations in the container.

Figure 2:
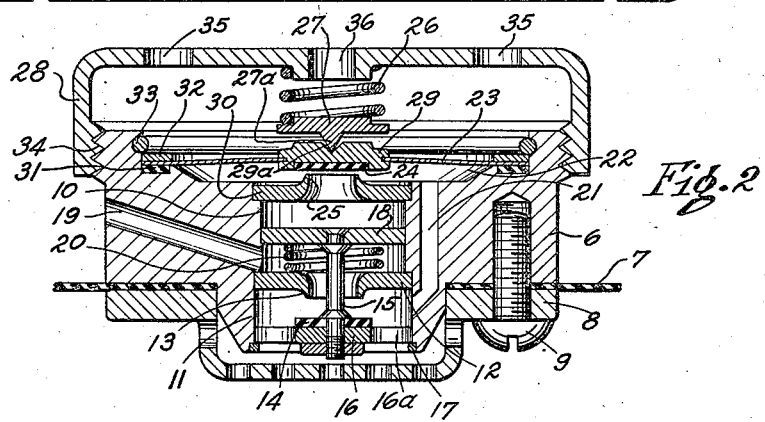
Figure 2 is a cross sectional view of the valve in its open position.

Referring to the drawings, the valve body 6 is clamped to an opening in a pressure vessel 7 by means of a perforated cover plate 8 and screws 9. The pressure vessel or container is adapted to be supplied with a gas such as air or the like through inlet 7a and such gas or the like may be exhausted from the container 7 through an outlet 7b or like escape means at various intervals and rates. It is desired that the container gauge pressure remain constant regardless of the variations in atmospheric pressure, flow rate at inlet or rate of escape from the container. The outlet 7b forms no essential part of my invention and it will be understood as the description proceeds that the valve of my invention maintains a pressure within certain limits within the container 7 without regard to the presence or absence of an outlet such as 7b. The valve body 6 is preferably circular in form and is provided centrally thereof with a passageway having a cylindrical surface 10 separated from a second cylindrical surface 11 by a pressed-in release port member 12. The member 12 is centrally apertured and provided with a shoulder port as at 13. The port closure 14 which is preferably made of a resilient material, substantially impervious to temperature changes, is clamped by means of the valve stem 15 to a metal spider 16. The spider 16 is cruciform in shape and the arms 16a of the spider bear against the walls of the cylinder 11. The closure member 14 and the spider 16 are limited in their upward travel with respect to the port by the abutment of the closure member against the shouldered port opening 13 and are limited in their downward travel by a pressed-in ring 17. The end of the valve stem 15 remote from the port is riveted or otherwise attached to a piston 18 which has a free sliding fit in the cylinder 10. It is pointed out that when the assembly of piston and closure member is moved to its open position as shown in Figure 2, the fluid under pressure within the container 7 may pass outwardly through the port 13, and thence through the radial passageway 19 where the fluid is exhausted to the atmosphere.

A light compression spring 20 acts jointly with the pressure differential between container 7 and the atmosphere to restore the piston and closure to the position shown in Fig. 1. The clearance between the piston 18 and the walls of the cylinder 10 is such that gas trapped between the top of the piston and the end of the cylinder closed by disc 24 escapes around the edge of the piston to atmosphere. The fluid pressure within the container is utilized to open the release port 13 by providing a passageway 21 adapted to lead fluid pressure from the container 7 into a diaphragm chamber 22 where said pressure may be effective to raise the diaphragm 23 therein and thus raise the cylinder port closure 24 from the cylinder port 25. A spring 26 disposed between the equalizing washer 27 and the cover plate 28 acts through the diaphragm button 29 to hold the cylinder port closure 24 down against the cylinder port 25 formed in a metal disk 30 pressed into the upper end of the cylinder 10. Preferably the diaphragm is sealed against the loss of fluid pressure as at 31 and its edges are maintained in a fixed position by the annular ring 32 and the snap ring 33. In the preferred embodiment of my valve the cover plate 28 is maintained in engagement with the body 6 by a threaded connection as at 34 and thus by rotating the cover plate with respect to the body 6, the resistive effect of the coil spring 26 may be varied.

The diaphragm 23 is preferably formed of a beryllium-copper alloy and the resistive force of the spring 26 is applied to the diaphragm through the diaphragm button 29 at a single point by means of a conical projection 27a fitted into a drill point recess 29a on the upper side of the diaphragm button 29. This arrangement eliminates any tendency of the spring 26 to distribute its resistive force unevenly to the upper side of the diaphragm.

Assuming that the cover 28 is so adjusted and the spring 26 is properly proportioned, the cover may be adjusted so that the diaphragm will resist fluid pressure in the diaphragm chamber 22 of 3.65 pounds per square inch. It will be observed that the fluid pressure in the diaphragm chamber 22 is the same as fluid pressure within the container 7. When the fluid pressure in the container and in the diaphragm chamber 22 reaches about 3.7 pounds per square inch, it is effective to lift the diaphragm to the position shown in Fig. 2. The diaphragm movement away from the port 25 permits the fluid pressure in the diaphragm chamber to enter the cylinder 10, where such pressure is effective against the piston 18 and the spring 20 to lower the piston in the cylinder and thus open the release port 13. The area of the piston exceeds the area of the relief port 13 and thus a pressure of 3.7 pounds per square inch on the piston is effective to hold the closure 14 open against a corresponding pressure in the container even though the closure 14 is urged to closed position by the light spring 20. It will be observed that the piston exerts no opening force on the closure 14 until the diaphragm is raised and thus the full container pressure is available for closing and sealing 14 prior to the raising of the diaphragm.

The release port 13 remains in the open position obtained as above described until the pressure within the container has dropped to about 3.6 pounds per square inch. The drop in the fluid pressure within the container is reflected in the fluid pressure drop in the diaphragm chamber 22 so that the diaphragm is restored to the position of Fig. 1.

The adjustable cover 28 is apertured as at 35 and 36, so that the atmospheric pressure is effective on the upper side of the diaphragm 23. Accordingly, the atmospheric pressure corresponding to about 14.7 pounds per square inch at sea level assists the spring 26 in holding the diaphragm in the position shown in Fig. 1. When, however, the valve is mounted in aircraft, and such aircraft ascends to a high altitude, the decrease in atmospheric pressure is effective to decrease the overall pressure available to hold the diaphragm in its closed position and thus a uniform differential pressure is automatically obtained in the container 7 with respect to atmospheric pressure. This means that the valve of my invention may be adjusted at sea level to maintain a pressure differential between the container and the atmosphere of 3.65 pounds per square inch. This pressure differential or gauge pressure will be maintained constant regardless of atmospheric pressure changes effected by the altitude of the aircraft. It is therefore among the advantages of my invention that regardless of the reduction in atmospheric pressure caused by high altitude flying, a constant differential between the pressure within the container 7 and the atmosphere is maintained.

It will be observed by reference to Fig. 1 that the fluid pressure in the diaphragm chamber 22 is acting to open the cylinder port 25 and that the effective pressure area is the annular area of the diaphragm around the port 25. When, however, the port 25 is opened (as in Fig. 2) the fluid pressure in the diaphragm chamber 22 is also effective against the circular port area on the cylinder port closure 24 and thus there is effective a greater total area tending to hold the port 25 open after it is opened, than the effective area available to initiate the opening. The differential in the effective area of the diaphragm between closed and open position is not sufficient to impair the operation of the valve under the pressures employed in the example outlined above. I am not unaware, however, that when working with lower pressures than that of the example outlined and where working within a narrower range of opening and closing values, it may be desirable to eliminate the effect of the diaphragm area differential. Accordingly, in the modified form of my device illustrated in Figs. 4, 5 and 6, I have provided a compensating or balancing arrangement which eliminates the adverse effect associated with diaphragm area differentials between open and closed positions of the cylinder port.

Figure 4:
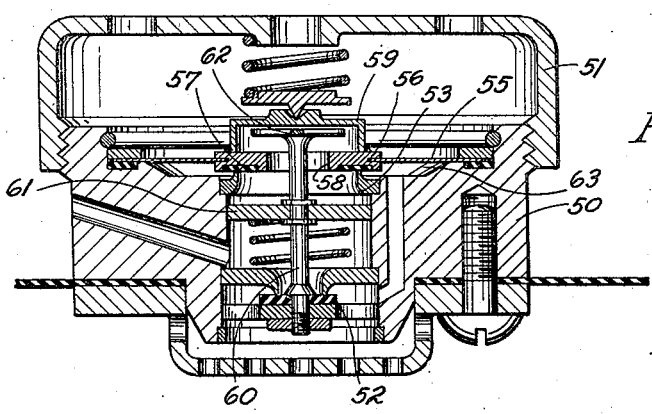
Figure 4 is a sectional view of a modified form of a valve made according to my invention having a balancing or compensating device incorporated therein.

Referring to Fig. 4, a valve body 50, cover plate 51 and release port closure 52 are arranged substantially as in the preferred embodiment. A piston port 53 in the modified form exceeds the area of the piston port in the preferred form and, accordingly, there is a wider effective area differential in the diaphragm between closed and open positions in the modification. The diaphragm 55 is provided with a diaphragm port closure 56 having a sealing ring 57 on the underside thereof to bear against the edges of the port 53. The diaphragm button 56 is apertured as at 58 and a button housing or cap 59 is brazed or otherwise secured to the diaphragm buttton 56. The valve stem 60 which connects the port closure 52 to the piston 61 is extended upwardly beyond the piston and terminates in an enlarged cruciform head or spider 62. The button housing 59 is proportioned axially with respect to the cruciform head or spider 62 so that the spider and housing may have limited movement relative to each other.

Figure 5:
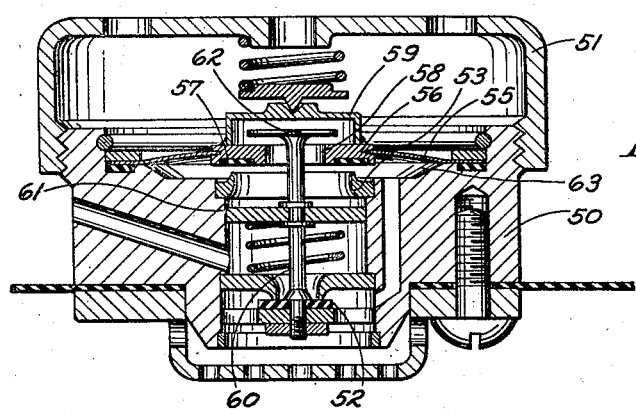
Figure 5 is a sectional view of the modified form of Fig. 4 showing the position of the valve parts immediately prior to an opening of the main valve.
Figure 6:
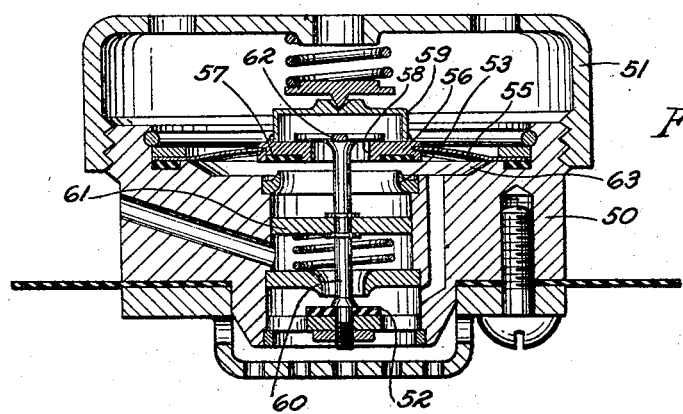
Figure 6 is a sectional view of the modified form of Fig. 4 showing the valve in its open position.

Referring to Fig. 5, it will be noted that the initiation of the opening movement is substantially the same as that in the preferred embodiment, namely, the fluid pressure in the diaphragm chamber 63 is effective on the annular area of the diaphragm around the port 53 to raise the diaphragm button 56 slightly away from the port 53. As soon as the diaphragm is raised from the port 53, the port area on the diaphragm button is also effective to increase the lift of the diaphragm which effect is also found in the preferred embodiment. The next step of the operation is also like the preferred embodiment, namely, the piston is moved downwardly to open the relief port normally closed by member 52. In the event that the added effective area of the diaphragm when raised should cause a further lifting of the diaphragm beyond the position shown in Fig. 6, the arms on the cruciform head 62 will be brought into engagement with the upper side of the diaphragm button 56 as shown in Fig. 6. This means that any additional upward movement of the diaphragm will carry the valve stem 60, the piston 61 and port closure 52 upwardly therewith. The difference in effective area of the diaphragm acted on by container fluid pressure when the diaphragm is in open and closed positions is represented by the area of the port 53 and this additional effective area tends to continue lifting movement of the diaphragm at a pressure which would maintain the diaphragm in a lower position without the additive effect. A connection between the diaphragm and piston under these conditions results in further lifting movement being opposed by the piston, or in effect when the additional effective diaphragm area becomes a factor tending to move the diaphragm to a position corresponding to a higher container pressure than exists, or would be necessary to move the diaphragm to such position with only the closed position effective area, the piston resistance counterbalances this additive effect. It will be noted by reference to Figure 6 that the first position at which the diaphragm can contact stem 60 is with closure 52 in its lowermost or fully opened position, and since the additive effect is immediately counterbalanced upon contact of the diaphragm with head 62 of the stem, the force tending to hold the diaphragm away from the port aperture 53 is correspondingly reduced so that the diaphragm tends to drop away from head 62. Intermittent contact of the diaphragm and head 62 will then continue until the container pressure drops to a point below the spring pressure on the diaphragm. The compensating provision permits a delicate adjustment of the diaphragm rendering it responsive to minute changes in fluid pressure. This modification makes available a larger cylinder port opening with the attendant advantage that a slight opening thereof permits a considerable volume of fluid flow resulting in a quick positive pressure relief within such narrow limits that the container pressure remains substantially constant.

Figure 3:
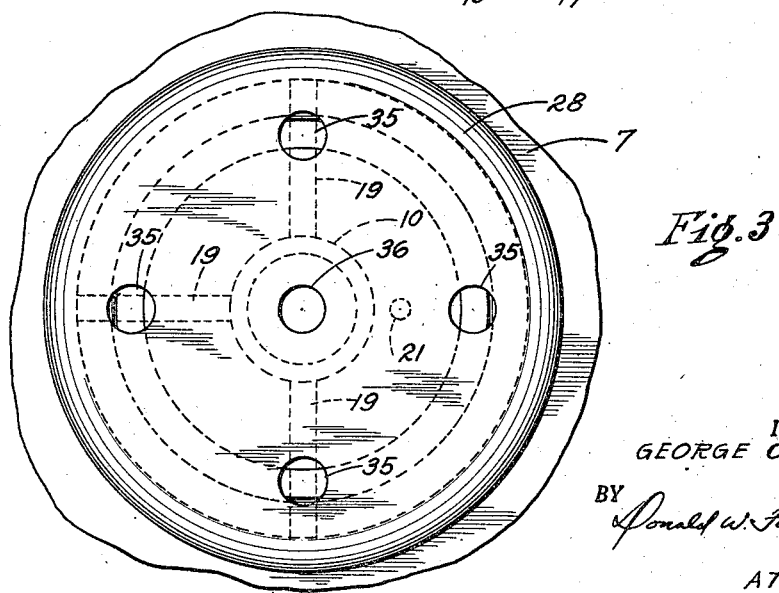
Figure 3 is a plan view of the valve of Fig. 1.

In the modification shown in Figs. 7 and 8, the principal operating parts of the valve are retained in substantially the same form as in the preferred embodiment. It will be noted that the release port 80, the closure therefor 81 and the piston 82 are arranged to function as in the form of Figs. 1-3. The modified form of Figs. 7 and 8 is designed to facilitate the control of the valve. To this end the diaphragm 83 is held in position by a ring 84 threaded to the body. The ring 84 is provided with a flange 85 which serves as a stop flange so as to limit the movement of a stop pin 86 to about 180 degrees. The path of movement of the two extreme positions of the stop pin 86 are shown best in Fig. 8. The stop pin 86 is threaded to the valve cover 87 and the periphery of the head of the threaded pin 86 is adapted to be received in notches or recesses 88 in a supplemental cap 89. The supplemental cap 89 is fixed to the handle or operating knob 90 by means of a screw 91 or the like. From the above described construction it will be observed that a turning of the handle or knob 90 carries the pin 86 and the cap 89 through an angular path which is limited by the flange 85 of the ring 84 and thus the adjustment of the point at which the valve will open is restricted between the limits defined by the flange 85. This range of limits, however, may be varied by removing the stop pin 86 and turning the supplemental cap 89 with respect to the cover 87 as provided by the threaded connection between these two parts. In this way the compression or resistive effect of the spring 92 may be varied and the pin 86 re-inserted to limit the manual adjustment. For instance, the valve may be adjusted in the laboratory so that when the pin 86 is in the position shown in Fig. 8 the diaphragm will be raised by a fluid pressure of 2.9 pounds and upon the pin 86 being moved to the dotted line position of Fig. 8 the diaphragm will be raised at a lower pressure such as for instance 2.6 pounds per square inch. When, however, it is desired to use the valve at a higher pressure such as in the neighborhood of 5 pounds per square inch, the supplemental cap 89 may be turned downwardly so as to increase the effect of the spring 92, whereby the pin 86 in the position shown in Fig. 8 will require a fluid pressure on the diaphragm of 4.9 pounds per square inch. With the last named adjustment of the cap 89, the pin may be swung to the dotted line position of Fig. 8, whereby a pressure of 4.6 pounds per square inch is effective to open the release port.

An advantage of the arrangement shown in Figs. 7 and 8 is that the equipment including the valve may be adjusted before installation on the aircraft or the like so as to be operable between certain definite limits and it will be impossible for the pilot or user of the equipment to inadvertently turn the cap 87 beyond the limits provided by the initial adjustment. In other words, where the equipment is designed to be adjustable by the pilot between the limits of 2.6 and 2.9 pounds per square inch, it will be impossible for the pilot to inadvertently increase the resistive effect of the spring 92 so that a pressure of more than 2.9 pounds per square inch may be attained within the container.

It will be appreciated that the arc through which the pin 86 swings may be increased up to about 350 degrees so that a wider manual adjustment is available. Thus the spring may be further compressed so that in the event the inlet fluid pressure is momentarily interrupted the pressure in the container may be locked against escape through the pressure release valve. For instance, if a three pound pressure is being maintained at the time it is desired to interrupt the flow into the container 7 at the inlet 7a, a turning down of the member 87 to a 4 or 5 pound position, positively seals the relief valve against the release of the container pressure.

Although I have shown and described three forms of my invention in considerable detail, it will be appreciated by those skilled in the art that numerous modifications may be made therein without departing from the scope of the invention defined in the following claims.

Having thus described my invention, what I claim is:

1. A relief valve for a fluid pressure container comprising a valve body having an inlet and a relief port, a closure for said port adapted to be urged to closed position by inlet fluid pressure, means responsive to fluid pressure including a movable element having an area exceeding the area of said relief port and connected to said closure, means to admit inlet fluid pressure to said first named means, including a passageway and a diaphragm control valve therefor, means exposing one side of said diaphragm to atmospheric pressure to urge said diaphragm control valve to closed position, the other side of said diaphragm being exposed to fluid pressure in said passageway and effective upon a predetermined increase thereof to open said diaphragm control valve to permit said pressure fluid to actuate said first named means to open said relief port closure, and limiting means connected to the fluid pressure responsive means and engageable by the diaphragm whereby maximum diaphragm movement in response to said fluid pressure is resisted by the fluid pressure responsive means thereby lowering the effective lifting force on the diaphragm and resulting in intermittent contact between the diaphragm and said limiting means until the container pressure drops to a predetermined value.

2. The relief valve as described in claim 1 and wherein spring means are provided continuously urging the diaphragm control valve towards closed position, and the spring means are adjustable to vary the inlet pressure required to open the diaphragm control valve.

3. A relief valve for a fluid pressure container comprising a valve body forming a cylinder, one end of the cylinder having a relief port therein for inlet pressure, a closure for said relief port adapted to be urged to closed position by inlet fluid pressure, a piston in the cylinder having an area exceeding the area of said relief port and connected to said closure, the valve body having a passageway therein continuously effecting communication between atmosphere and the cylinder at the relief port side of the piston, the cylinder having a port therein at the opposite side of the piston, a diaphragm valve controlling said last named port, the valve body having a second passageway therein adapted to continuously communicate inlet fluid pressure to one side of the diaphragm, means exposing the other side of the diaphragm to atmospheric pressure to urge the control valve to closed position, the diaphragm being effective upon a predetermined increase in inlet fluid pressure to open the control valve and permit fluid pressure to act on the piston and open the relief port closure, and means connected to the piston and loosely projected through and engageable with the diaphragm whereby maximum opening movement of the diaphragm control valve is resisted by the piston thereby lowering the effective lifting force on the diaphragm and resulting in intermittent contact between the diaphragm and said piston connected means until the inlet pressure drops to a predetermined value.

GEORGE C. FIELDS.